(12) United States Patent
Zheng et al.

(10) Patent No.: US 12,191,948 B1
(45) Date of Patent: Jan. 7, 2025

(54) METHOD FOR REALIZING SPLITTING-RATE MULTI-ACCESS OF MOBILE CELL-FREE MASSIVE MIMO SYSTEM

(71) Applicant: BEIJING JIAOTONG UNIVERSITY, Beijing (CN)

(72) Inventors: Jiakang Zheng, Beijing (CN); Jiayi Zhang, Beijing (CN); Bo Ai, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 13 days.

(21) Appl. No.: 18/446,504

(22) Filed: Aug. 9, 2023

(51) Int. Cl.
*H04L 5/12* (2006.01)
*H04B 7/0456* (2017.01)
*H04B 7/06* (2006.01)

(52) U.S. Cl.
CPC ......... *H04B 7/0478* (2013.01); *H04B 7/0626* (2013.01)

(58) Field of Classification Search
CPC ........................... H04B 7/0478; H04B 7/0626
USPC ................ 375/262, 260, 259, 219, 295, 316
See application file for complete search history.

(56) References Cited

U.S. PATENT DOCUMENTS

2011/0218000 A1* 9/2011 Noh ..................... H04W 52/267
455/501

\* cited by examiner

*Primary Examiner* — Zewdu A Kassa
(74) *Attorney, Agent, or Firm* — CBM PATENT CONSULTING, LLC (57) ABSTRACT

A method for realizing rate-splitting multi-access in a mobile cell-free massive MIMO system includes the following steps: splitting, by an access point, the data of each user into two parts with common message and private message, coding all the common message into one super message common message stream, coding each piece of the private message into a private message stream; coding, by the access point, the private message stream using an arbitrary linear pre-coding method, coding the super common message stream using an optimal pre-coding method, and sending the final coded super common message streams to user terminals after superimposing the final coded super common message stream on the private message streams; first decoding, by the user terminals, the super common message stream, removing the super common message stream using successive interference cancellation technology, and then decoding the private message streams.

7 Claims, 4 Drawing Sheets

METHOD FOR REALIZING SPLITTING-RATE MULTI-ACCESS OF MOBILE CELL-FREE MASSIVE MIMO SYSTEM

CROSS-REFERENCE TO RELATED APPLICATIONS

This application claims priority to Chinese Patent Application Ser. No. CN2023107924438 filed on 30 Jun. 2023.

TECHNICAL FIELD

The present invention relates to the technical field of mobile communications and, in particular, to a method for realizing rate-splitting multi-access in a mobile cell-free massive MIMO system.

TECHNICAL BACKGROUND

With the rapid development of mobile communication networks, cellular networks are constantly subdivided. A cell area is constantly shrinking. Base stations need to be deployed more densely. This not only increases the difficulty of base station construction, increases network investment and energy consumption at a base station end, but also causes more inter-cell interference and more frequent cross-area switching problems. As a result, a novel cell-free network architecture that differs from a cellular cell architecture has received much attention. User-centric cell-free massive MIMO (Multiple-Input Multiple-Output) technology is evolution of traditional massive MIMO, and a huge leap forward for a cellular network towards a cell-free network architecture. A cell-free massive MIMO system includes a plurality of APs (Access Points) that are connected to a CPU (Central Processing Unit) via fronthaul links and utilize the same time-frequency resources to serve all users in the network simultaneously. Therefore, both a distributed system macro diversity gain and a massive MIMO antenna gain are available. With the advantages of large data throughput, low latency, high reliability, high energy efficiency, and uniform and dense network coverage, the cell-free massive MIMO system is considered to be the key core technology of a 6G wireless communication network. Indeed, the advantages of cell-free massive MIMO rely heavily on efficient transceiver design, which also means that the system needs to obtain accurate CSI (Channel State Information) in a timely manner.

However, the problem of CSI obsolescence due to user mobility prevents the cell-free massive MIMO from taking full advantage of the gain of coherent processing, which causes a significant performance loss in real deployment. In addition, imperfect CSI also affects the cell-free massive MIMO system to design an effective transceiver to suppress inter-user interference, which becomes a major factor limiting the capacity growth of the cell-free massive MIMO system.

Rate-splitting multi-access technology splits user message sent by the access point into two parts with a common message and a private message, and then combines all the common message of all the users into one super common message stream that is superimposed on a private message stream and sent at the same time. A user end considers the private message as noise and decodes the common message, and then continues to decode the private message after removing the common message using SIC (Successive Interference Cancellation) technology. The rate-splitting multi-access technology can decode part of interference while treating part of the interference as noise, which can effectively enhance the interference management capabilities of the cell-free massive MIMO system.

Currently, the previous work lacks a rate-splitting multi-access strategy of the cell-free massive MIMO architecture, especially in a complex mobile scenario where outdated CSI affects cell-free network performance. Therefore, there is an urgent need to design a robust rate-splitting multi-access strategy based on a mobile cell-free massive MIMO system to guide a practical deployment application.

SUMMARY

An embodiment of the present invention provides a method for realizing rate-splitting multi-access in a mobile cell-free massive MIMO system to enhance the interference management capability and robustness of the system and improve the transmission rate performance of the system.

To realize the forgoing objective, the present invention adopts the following technical solutions.

A method for realizing rate-splitting multi-access in a mobile cell-free massive MIMO system includes:
  splitting, by an access point in the mobile cell-free massive MIMO system, data of each user into two parts with common message and private message, coding all the common message into one super common message stream, and coding each piece of the private message into a private message stream;
  determining, by the access point, a power splitting ratio between the common message and the private message based on a large-scale channel state information;
  coding, by the access point, the private message stream using an arbitrary linear pre-coding method, solving, by the access point, a problem of maximizing the minimum common message rate of a user using bisection-based iterative optimization to obtain an optimal pre-coding method for the super common message stream, and coding the super common message stream using the optimal pre-coding method;
  sending, by the access point, the final coded super common message stream to user terminals after superimposing the final coded super common message stream on the private message stream;
  first decoding, by the user terminal, the super common message stream, removing the super common message stream using successive interference cancellation technology, and then decoding the private message stream.

Preferably, the steps of splitting, by the access point in the mobile cell-free massive MIMO system, the data of each of the users into two parts with the common message and the private message, coding all the common message into one super common message stream, and coding each piece of the private message into the private message stream include:
  assuming that the cell-free massive MIMO system includes L access points and K users, the message sent by each of the access points to the user being $W_k$, k=1, ..., K, and splitting, by each of the access points, user message $W_k$ into the common message $W_{c,k}$ and the private message $W_{p,k}$;
  combining all the common message $W_{c,1}, \ldots, W_{c,K}$ of all the users into one super common message $W_c$, coding the super common message $W_c$ into the super common message stream $s_c$ using a common codebook, and coding the private message $W_{p,1}, \ldots, W_{p,K}$ of each of the users into the private message streams $s_1, \ldots, s_K$.

Preferably, the step of determining, by the access point, the power splitting ratio between the common message and the private message based on the large-scale channel state information includes:

calculating, by each of the access points, the power splitting ratio between the common and the private message based on the large-scale channel state information using the following equation:

$$t_l = t + \Delta_l$$

$$\Delta_l = \omega \frac{\beta_l - \left(\sum_{l=1}^{L} \beta_l\right)/L}{\max\left\{\left|\beta_l - \left(\sum_{l=1}^{L} \beta_l\right)/L\right|\right\}}$$

$$\beta_l = \left(\left(\sum_{k=1}^{K} \beta_{kl}\right)/K\right)^{\alpha}$$

$$\omega = \min\{t-0, 1-t\}/\varepsilon$$

where t is an initial power splitting ratio of the common message and the private message of each of the access points, $\Delta_l$ is a power splitting ratio adjustment factor of each of the access points, $\beta_{kl}$ is a large-scale fading coefficient between a k-th user and a l-th access point, $\beta_l$ is an average channel quality coefficient from the l-th access point to all the users, $\alpha$ is a scaling factor of average channel quality, $\omega$ is an adjustment range of a power splitting ratio, $\varepsilon$ is a scaling factor of the adjustment range, and $t_l$ is an adjusted power splitting ratio of the common message and private message of the access point.

Preferably, the step of coding, by the access point, the private message stream using the arbitrary linear pre-coding method includes:

using, by a normalized pre-coding vector $v_{c,kl}^{norm}$ of the private message stream, various linear pre-coding solutions obtained in cell-free massive MIMO, the linear pre-coding solutions comprising maximum ratio transmission pre-coding, local minimum mean-square error pre-coding, and centralized minimum mean-square error pre-coding; calculating normalized maximum ratio transmission pre-coding as:

$$v_{kl,n}^{norm} = \hat{h}_{kl,n}/\sqrt{E\{\|\hat{h}_{kl,n}\|^2\}}$$

where $\hat{h}_{kl,n}$ is an estimated channel state information from the k-th user to the l-th access point at a n-th time slot; calculating normalized local minimum mean-square error pre-coding as:

$$v_{kl,n}^{norm} = v_{kl,n}/\sqrt{E\{\|v_{kl,n}\|^2\}}$$

where $v_{kl,n}$ is minimum mean-square error pre-coding designed for the k-th user by the l-th access point at the n-th time slot based on local channel state information, and calculated as:

$$v_{kl,n} = \frac{p_d(1-t_l)}{K}\left(\sum_{i=1}^{K} \frac{p_d(1-t_l)}{K}\left(\hat{h}_{il,n}\hat{h}_{il,n}^H + C_{il,n}\right) + \sigma^2 I_N\right)^{-1} \hat{h}_{kl,n}$$

where $p_d$ is a maximum downlink transmission power per the access point, $C_{il,n}$ is a variance of the channel estimated error from the i-th user to the l-th access point at the n-th time slot, and $\sigma^2$ is a noise power of a receiver;

calculating normalized centralized minimum mean-square error pre-coding as:

$$v_{kl,n}^{norm} = v_{kl,n}/\sqrt{\max_{l=1,\ldots,L}\{E\{\|v_{kl,n}\|^2\}\}}$$

where $v_{kl,n}$ is minimum mean-square error pre-coding designed for the k-th user by the l-th access point at the n-th time slot based on global channel state information, and calculated as:

$$v_{kl,n} = \frac{1}{\sqrt{1-t_l}}\bar{v}_{kl,n}\left[\bar{v}_{kl,n}^T, \ldots, \bar{v}_{kl,n}^T\right]^T =$$

$$\bar{v}_{k,n} = \frac{p_d}{K}\left(\sum_{i=1}^{K} \frac{p_d}{K}\left(\hat{h}_{i,n}\hat{h}_{i,n}^H + C_{i,n}\right) + \sigma^2 I_{LN}\right)^{-1} \hat{h}_{k,n}$$

where $\hat{h}_{i,n}$ is an estimated channel state information vector consisting of the i-th user to all access points at the n-th time slot, $C_{i,n}$ is a variance of an estimated error of the channel vector, and $\bar{v}_{k,n}$ is the minimum mean-square error pre-coding vector designed by a central processing unit for the k-th user at the n-th time slot based on the global channel state information.

Preferably, the steps of solving, by the access point, the problem of maximizing the minimum common message rate of the user using the bisection-based iterative optimization to obtain the optimal pre-coding method for the super common message stream, and coding the super common message stream using the optimal pre-coding method include:

constructing the following problem of maximizing the minimum common message rate based on power consumption limitation of each of the access points:

$$\max_{\{v_{c,l,n}^{norm}\}} \min_{k=1,\ldots,K} R_{k,n}^c(v_{c,l,n}^{norm})$$

$$\text{s.t. } \|v_{c,l,n}^{norm}\|^2 \leq 1, \forall l$$

where $R_{k,n}^c$ is a rate at which the k-th user decodes the received common message at the n-th time slot, and is a function of normalized common message pre-coding $v_{c,l,n}^{norm}$;

the forgoing equation is equivalent to:

$$\max_{\{\bar{v}_{c,n}\}} \min_{k=1,\ldots,K} \frac{p_d\left|\hat{h}_{k,n}^H \bar{v}_{c,n}\right|^2}{p_d(\bar{v}_{c,n})^H C_{k,n}\bar{v}_{c,n} + \kappa_{k,n}}$$

$$s.t. \|v_{c,l,n}^{norm}\|^2, 1, \forall l$$

where $\bar{v}_{c,n}$ is a common message pre-coding vector consisting of all the access points at the n-th time slot; $\kappa_{k,n}$ is a function of a private message pre-coding vector, is independent of an optimization variable $\bar{v}_{c,n}$ and is calculated as:

$$\kappa_{k,n} = \frac{p_d}{K}\sum_{i=1}^{K}\left|\hat{h}_{k,n}^H \bar{v}_{i,n}\right|^2 + \frac{p_d}{K}\sum_{i=1}^{K}\bar{v}_{i,n}^H C_{k,n}\bar{v}_{i,n} + \sigma^2$$

$\bar{v}_{i,n}$ is the private message pre-coding vector designed for all the access points by the i-th user at the n-th time slot; solving the forgoing problem of maximizing the minimum common message rate using the bisection-based iterative optimization to obtain an optimal common message pre-coding solution, and coding the super common message stream using the optimal common message pre-coding solution.

Preferably, the step of sending, by the access point, the final coded super common message stream to the user terminals after superimposing the final coded super common message stream on the private message stream includes:

superimposing the linear pre-coded common and private message streams together and combining a transmission signal $x_l$ of the l-th access point as:

$$x_l = \sqrt{p_d t_1}\, v_{c,l}^{norm} s_c + \sqrt{\frac{p_d(1-t_1)}{K}} \sum_{i=1}^{K} v_{il}^{norm} s_i$$

where $p_d$ is a maximum downlink transmission power of each of the access points, $t_l$ is a transmission power splitting ratio of the super common message stream of the l-th access point, the transmission power splitting ratio of the super common message stream is $t_l$, $s_i$ is the private message sent to the i-th user, and $s_c$ is the sent common message.

Preferably, the steps of first decoding, by the user terminal, the super common message stream, removing the super common message stream using the successive interference cancellation technology, and then decoding the private message stream include:

a signal $r_{k,n}$ received by the k-th user in the n-th time slot being:

$$r_{k,n} = \sum_{l=1}^{L} h_{kl,n}^H x_{l,n} + w_{k,n} = \sqrt{p_d}\sum_{l=1}^{L} h_{kl,n}^H \sqrt{t_l}\, v_{c,l,n}^{norm} s_{,n} +$$

$$\sqrt{\frac{p_d}{K}}\sum_{l=1}^{L} h_{kl,n}^H \sqrt{1-t_l}\, v_{kl,n}^{norm} s_{k,n} + \sqrt{\frac{p_d}{K}}\sum_{i\ne k}^{K}\sum_{l=1}^{L} h_{kl,n}^H \sqrt{1-t_l}\, v_{il,n}^{norm} s_{i,n} + w_{k,n}$$

decoding the super common message stream in the signal $r_{k,n}$ using the common codebook, removing the signal of the super common message stream by successive interference cancellation technology, considering, by the user, the private message streams of the other users as noise, decoding the private message stream, and calculating signal interference noise ratios of the common message and the private message in the n-th time slot as respectively:

$$\mathrm{SINR}_{k,n}^c = \frac{p_d\left|\hat{h}_{k,n}^H \bar{v}_{c,n}\right|^2}{\frac{p_d}{K}\sum_{i=1}^{K}\left|\hat{h}_{k,n}^H \bar{v}_{i,n}\right|^2 + p_d \bar{v}_{c,n}^H C_{k,n}\bar{v}_{c,n} + \frac{p_d}{K}\sum_{i=1}^{K}\bar{v}_{i,n}^H C_{k,n}\bar{v}_{i,n} + \sigma^2}$$

-continued $$\mathrm{SINR}_{k,n}^p = \frac{\frac{p_d}{K}\left|\hat{h}_{k,n}^H \bar{v}_{k,n}\right|^2}{\frac{p_d}{K}\sum_{i\ne k}^{K}\left|\hat{h}_{k,n}^H \bar{v}_{i,n}\right|^2 + \frac{p_d}{K}\sum_{i=1}^{K}\bar{v}_{i,n}^H C_{k,n}\bar{v}_{i,n} + \sigma^2}$$

where, $$\hat{h}_{k,n} = [\hat{h}_{k1,n}^T, \ldots, \hat{h}_{kL,n}^T]^T$$

$$\bar{v}_{c,n} = [\bar{v}_{c,1,n}^T, \ldots, \bar{v}_{c,L,n}^T]^T,\; \bar{v}_{c,l,n} = \sqrt{t_l}\, v_{c,l,n}^{norm}$$

$$\bar{v}_{i,n} = [\bar{v}_{il,n}^T, \ldots, \bar{v}_{iL,n}^T]^T,\; \bar{v}_{il,n} = \sqrt{1-t_l}\, v_{il,n}^{norm}$$

$$C_{k,n} = \mathrm{diag}(C_{k1,n}, \ldots, C_{kL,n})$$

calculating a total rate of the system at the n-th time slot as:

$$\mathrm{Sum}\, R_n = E\{\min_k\{R_{k,n}^c\}\} + \sum_{k=1}^{K} E\{R_{k,n}^p\}$$

$$= E\{\log_2(1 + \min_k\{\mathrm{SINR}_{k,n}^c\})\} + \sum_{k=1}^{K} E\{\log_2(1 + \mathrm{SINR}_{k,n}^p)\}.$$

As can be seen from the technical solutions provided by the forgoing embodiments of the present invention, in the present invention, the total rate of the system is significantly improved after the method utilizes the large-scale channel state information to adjust the power splitting ratio. In the present invention, a bisection-based iterative optimization pre-coding method always has the best total rate performance, and enhances the robustness of the cell-free massive MIMO system in a complex mobile environment.

Additional aspects and advantages of the present invention will be given in part in the following description and will become apparent from the following description or through the practice of the present invention.

BRIEF DESCRIPTION OF THE DRAWINGS

In order to describe the technical solutions of embodiments in the present invention more clearly, the following briefly introduces the drawings that need to be used in the embodiments. Obviously, the drawings in the following description are only some of embodiments of the present invention. The person skilled in the art can obtain other drawings based on these drawings without creative labor.

DETAILED DESCRIPTION OF EMBODIMENTS

Embodiments of the present invention are described in detail below. Examples of the embodiments are shown in the accompanying drawings. The same or similar reference numbers throughout denote the same or similar elements or elements having the same or similar function. The embodiments described below by reference to the accompanying drawings are exemplary, are intended only for the objective of explaining the present invention and are not to be construed as a limitation of the present invention.

Those skilled in the art may understand that the singular forms "a," "an," "the" and "the" used herein may also include the plural forms unless specifically stated. It is further understood that a term "comprising" as used in the specification of the present invention refers to the presence of such features, integers, steps, operations, elements and/or assemblies, but does not preclude the presence or addition of one or more other features, integers, steps, operations, elements, components and/or groups thereof. It should be understood that when an element is "connected" or "coupled" to another element, the element may be directly connected or coupled to other elements, or an intermediate element can be provided. In addition, "connecting" or "coupling" as used herein may include wireless connection or coupling. A term "and/or" as used herein includes any unit and all combinations of one or more associated listings.

Those skilled in the art may understand that unless defined otherwise, all terms used herein, including technical and scientific terms, have the same meaning as commonly understood by the person skilled in the art to which the present invention belongs. It should also be understood that terms such as those defined in the general dictionary are to be understood as having a meaning consistent with that in the context of the prior art and are not to be interpreted in an idealized or overly formal sense unless defined in a manner as is the case here.

In order to facilitate the understanding of the embodiments of the present invention, the following will be combined with the accompanying drawings to take a plurality of specific embodiments by way of examples to make further explanations, and each embodiment does not constitute a limitation of the embodiments of the present invention.

Embodiment 1

Figure 1:
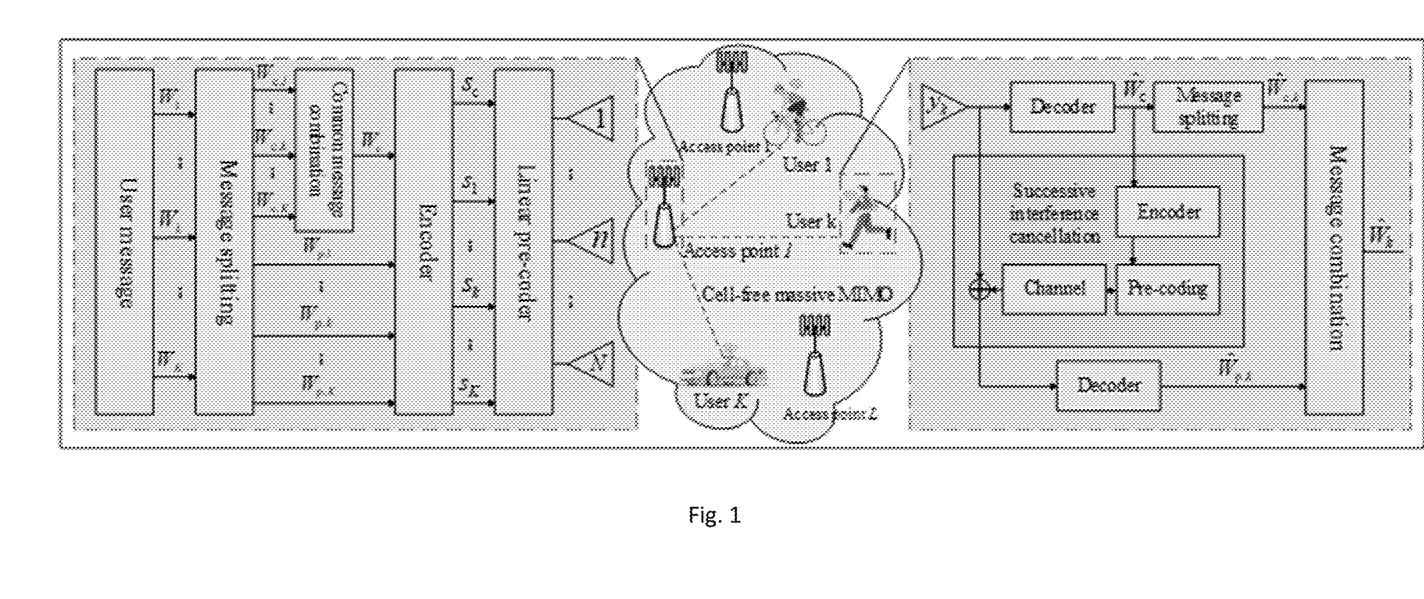
FIG. 1 is a flowchart of a method for realizing rate-splitting multi-access in a mobile cell-free massive MIMO provided by an embodiment of the present invention.
Figure 2:
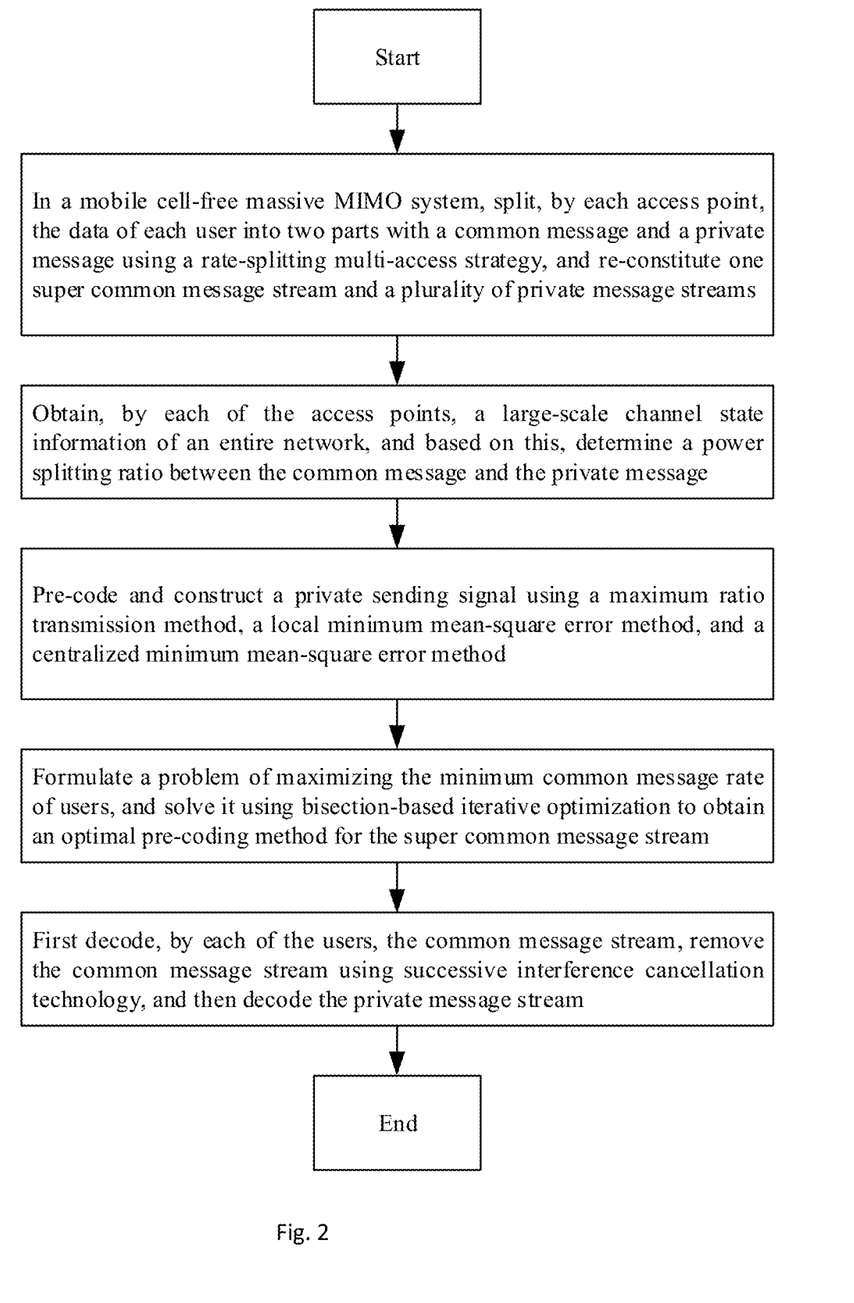
FIG. 2 is a schematic diagram of a method for realizing rate-splitting multi-access in a mobile cell-free massive MIMO system provided by an embodiment of the present invention.

An implementation schematic diagram of a method for realizing rate-splitting multi-access in a mobile cell-free massive MIMO system provided by an embodiment of the present invention is shown in FIG. 1. A specific processing flowchart is shown in FIG. 2, and includes the following processing steps:

Step S1: splitting, by an access point, the data of each user into two parts with a common message and a private message, coding all the common message into one super common message stream, coding each piece of the private message into a private message stream, and superimposing and sending out the super common message stream on the private message stream.

Step S2: determining, by each of the access points, a power splitting ratio between the common message and the private message based on a large-scale channel state information.

Step S3: using, by the private message stream, an arbitrary linear pre-coding method, and solving a problem of maximizing the minimum common message rate of the user using bisection-based iterative optimization to obtain an optimal pre-coding method for a super common message stream.

Step S4: sending, by the access point, the final coded super common message stream to user terminals after superimposing the final coded super common message stream on the private message stream.

Step S5: first decoding, by each of the user terminals, the super common message stream, removing the super common message stream using successive interference cancellation technology, and then decoding the private message stream.

Specifically, the forgoing step S1 includes: taking as an example one cell-free massive MIMO system including L access points and K users, using, by the system, coherent transmission, and moving, by different users, at different speeds. The message sent by each of the access points to the user is $W_k$, $k=1, \ldots, K$. Each of the access points then splits user message $W_k$ into the common message $W_{c,k}$ and the private message $W_{p,k}$.

All the common message is coded into one super common message stream. Each piece of the private message is coded into the private message stream. All the common message $W_{c,1}, \ldots, W_{c,k}$ of all the users are combined into one super common message $W_c$, and then the super common message $W_c$ is coded into the super common message stream $s_c$ using a common codebook. The private message $W_{p,1}, \ldots, W_{p,K}$ of each of the users are coded into the private message streams $s_1, \ldots s_K$, respectively.

Specifically, the forgoing step S2 includes: determining, by each of the access points, a power splitting ratio of the common message and the private message based on the large-scale channel state information, mainly including, by the large-scale channel state information, path loss and shadow fading, and describing the change of a channel over a long period of time and being easily accessible.

The service capability of each of the access points is measured based on a large-scale channel fading message of the system. The access point with strong service capability distributes more power to the common message. Conversely, the access point with weak service capability distributes less power to the common message.

The power splitting ratio of the common message of each of the access points is calculated using the following equation:

$$t_l = t + \Delta_l$$

$$\Delta_l = \omega \frac{\beta_l - \left(\sum_{l=1}^{L} \beta_l\right)/L}{\max\left\{\left|\beta_l - \left(\sum_{l=1}^{L} \beta_l\right)/L\right|\right\}}$$

$$\beta_l = \left(\left(\sum_{k=1}^{K} \beta_{kl}\right)/K\right)^\alpha$$

$$\omega = \min\{t-0, 1-t\}/\varepsilon$$

where t is an initial power splitting ratio of each of the access points, $\Delta_l$ is a power splitting ratio adjustment factor of each of the access points, $\beta_{kl}$ is a large-scale fading coefficient between a k-th user and a l-th access point, $\beta_l$ is an average channel quality coefficient from the l-th access point to all the users, $\alpha$ is a scaling factor of average channel quality, $\omega$ is an adjustment range of a power splitting ratio, $\varepsilon$ is a scaling factor of the adjustment range, and $t_l$ is a final power splitting ratio of the common message and the private message of the access point.

Based on the forgoing power distribution principle, the power splitting ratio factor of each of the access points is adjusted based on an equal power splitting ratio solution $t_l = \ldots = t_L = t$.

Therefore, during subsequent processing, the power splitting ratios of the common message and the private message are different for each of the access points. A final power splitting ratio $t_l$ used is effective in suppressing interference and fully utilizes the usage effectiveness of an access point power.

Specifically, the forgoing step S3 includes: using, by the private message stream, the arbitrary linear pre-coding method. A normalized pre-coding vector $v_{c,kl}^{norm}$ of the private message stream can directly use various linear pre-coding solutions obtained in conventional cell-free massive MIMO, which include maximum ratio transmission pre-coding, local minimum mean-square error pre-coding, and centralized minimum mean-square error pre-coding.

The normalized pre-coding vector $v_{il,n}^{norm}$ of the private message stream can directly use various linear pre-coding solutions obtained in the conventional cell-free massive MIMO.

Normalized maximum ratio transmission pre-coding is calculated as:

$$v_{kl,n}^{norm} = \hat{h}_{kl,n} / \sqrt{E\{\|\hat{h}_{kl,n}\|^2\}}$$

where $\hat{h}_{kl,n}$ is an estimated channel state information from the k-th user to the l-th access point at a n-th time slot.

Normalized local minimum mean-square error pre-coding is calculated as:

$$v_{kl,n}^{norm} = v_{kl,n} / \sqrt{E\{\|v_{kl,n}\|^2\}}$$

where $v_{kl,n}$ is minimum mean-square error pre-coding designed for the k-th user by the l-th access point at the n-th time slot based on local channel state information, and calculated as:

$$v_{kl,n} = \frac{p_d(1-t_l)}{K}\left(\sum_{i=1}^{K}\frac{p_d(1-t_l)}{K}\left(\hat{h}_{il,n}\hat{h}_{il,n}^H + C_{il,n}\right) + \sigma^2 I_N\right)^{-1} \hat{h}_{kl,n}$$

where $p_d$ is a maximum downlink transmission power per the access point, $C_{il,n}$ is a variance of the channel estimated error from the i-th user to the l-th access point at the n-th time slot, and $\sigma^2$ is a noise power of a receiver.

Normalized centralized minimum mean-square error pre-coding is calculated as:

$$v_{kl,n}^{norm} = v_{kl,n} / \sqrt{\max_{l=1,\ldots,L}\{E\{\|v_{kl,n}\|^2\}\}}$$

where $v_{kl,n}$ is minimum mean-square error pre-coding designed for the k-th user by the l-th access point at the n-th time slot based on global channel state information, and calculated as:

$$v_{kl,n} = \frac{1}{\sqrt{1-t_l}}\bar{v}_{kl,n}$$

$$[\bar{v}_{k1,n}^T, \ldots, \bar{v}_{kL,n}^T]^T = \bar{v}_{k,n} = \frac{p_d}{K}\left(\sum_{i=1}^{K}\frac{p_d}{K}\left(\hat{h}_{i,n}\hat{h}_{i,n}^H + C_{i,n}\right) + \sigma^2 I_{LN}\right)^{-1}\hat{h}_{k,n}$$

where $\hat{h}_{i,n}$ is an estimated channel state information vector consisting of the i-th user to all the access points at the n-th time slot, $C_{i,n}$ is a variance of an estimated error of the channel vector, and $\bar{v}_{k,n}$ is a minimum mean-square error pre-coding vector designed for the k-th user by a central processing unit at the n-th time slot based on the global channel state information.

The difference between local pre-coding and centralized pre-coding is that the local pre-coding can only use a local estimated channel state information, whereas the centralized pre-coding can use an estimated channel state information for the entire system.

A problem of maximizing the minimum common message rate of the user is solved using bisection-based iterative optimization to obtain an optimal pre-coding method for a super common message stream. The following problem of maximizing the minimum common message rate is constructed based on power consumption limitation of each of the access points:

$$\max_{\{v_{c,l,n}^{norm}\}} \min_{k=1,\ldots,K} R_{k,n}^c(v_{c,l,n}^{norm})$$

$$\text{s.t. } \|v_{c,l,n}^{norm}\|^2 \leq 1, \forall l$$

where $R_{k,n}^c$ is a rate at which the k-th user decodes the received common message at the n-th time slot, and is a function of normalized common message pre-coding $v_{c,l,n}^{norm}$.

The forgoing equation is equivalent to:

$$\max_{\{\bar{v}_{c,n}\}} \min_{k=1,\ldots,K} \frac{p_d|\hat{h}_{k,n}^H \bar{v}_{c,n}|^2}{p_d(\bar{v}_{c,n})^H C_{k,n}\bar{v}_{c,n} + \kappa_{k,n}}$$

$$\text{s.t. } \|v_{c,l,n}^{norm}\|^2, , 1, \forall l$$

Where $\bar{v}_{c,n}$ is the common message pre-coding vector consisting of all the access points at the n-th time slot.

In addition, $\kappa_{k,n}$ is a function of the private message pre-coding vector, independent of an optimization variable $\bar{v}_{c,n}$, and calculated as:

$$\kappa_{k,n} = \frac{p_d}{K}\sum_{i=1}^{K}|\hat{h}_{k,n}^H \bar{v}_{i,n}|^2 + \frac{p_d}{K}\sum_{i=1}^{K}\bar{v}_{i,n}^H C_{k,n}\bar{v}_{i,n} + \sigma^2$$

where $\hat{v}_{i,n}$ is the private message pre-coding vector designed for all the access points by the i-th user at the n-th time slot.

The forgoing problem is solved using the bisection-based iterative optimization. This method obtains the optimal common message pre-coding solution by solving a series of convex feasibility problems in each iteration. A specific algorithm flowchart is shown in a table below:

Pre-Coding Algorithm of the Common Message Based on the Bisection-Based Iterative Optimization
1. Initializing Y min and Y max to define a range of values for an objective function and selecting one threshold ε>0 to define a stopping criterion for loop iteration.
2. The normalized pre-coding vector of the common message is $$v_{c,l,n}^{norm} = \frac{1}{\sqrt{t_l}} \bar{v}_{c,l,n}.$$

3. Performing While $\gamma_{max} - \gamma_{min} > \varepsilon$.
4. Setting $\gamma = (\gamma_{max} + \gamma_{min})/2$ and solving the following convex feasibility problem:

$$\begin{cases} \sqrt{p_d} \hat{h}_{k,n}^H \bar{v}_{c,n} \cdots \sqrt{\gamma} \|u_{k,n}\| \\ \|\bar{v}_{c,l,n}\|^2 \le t_l, \forall\, l \end{cases}$$

5. Where $u_{k,n}$ is defined as:

$$u_{k,n} = \left[ \left( \sqrt{p_d} C_{k,n}^{\frac{1}{2}} \bar{v}_{c,n} \right)^T, \sqrt{\kappa_{k,n}} \right]^T$$

6. Setting $\gamma_{min} \square \gamma$ if the forgoing problem is feasible, otherwise setting $\gamma_{max} \square \gamma$.
7. End while Specifically, the forgoing step S4 includes: superimposing and sending out the super common message stream on the private message stream. The access point/uses a normalized vector $\|v_{c,l}^{norm}\|^2 \le 1$ to linearly pre-code the super common message stream and uses the normalized vector $\|v_{c,kl}^{norm}\|^2 \le 1$ to linearly pre-code the private message stream. The linearly pre-coded common and private message streams are superimposed together to combine a transmission signal of the l-th access point as:

$$x_l = \sqrt{p_d t_l}\, v_{c,l}^{norm} s_c + \sqrt{\frac{p_d(1-t_l)}{K}} \sum_{i=1}^{K} v_{il}^{norm} s_i$$

where $p_d$ is a maximum downlink transmission power of each of the access points, $t_l$ is a transmission power splitting ratio of the super common message stream of the l-th access point, the transmission power splitting ratio of the super common message stream is $t_l$.

Specifically, the forgoing step S5 includes: decoding, by the user end, the super common message stream, removing the super common message stream using the successive interference cancellation technology, and then decoding the private message stream, and includes: after receiving a mixed message stream, firstly considering, by the user end, the private message stream as noise, decoding the super common message stream using the common codebook, and removing the signal of the super common message stream by successive interference cancellation technology. Subsequently, the user considers the private message stream of other users as noise and decodes the private message streams directly.

N antennas are deployed at each of the access points, and a single antenna is deployed at each of the users. One resource block containing τ+1 time slots is used, where a channel state information of the 0-th time slot is known. The latter τ time slots are used for data transmission. At the n-th time slot, a channel from the access point 1 to a mobile user k is modeled as the following Rayleigh fading:

$$h_{kl,n} \sim CN(0, R_{kl}), n=0,1,\ldots,\tau$$

where $R_{kl} \in C^{N \times N}$ is a spatial correlation matrix, and $\beta_{kl} = \mathrm{tr}(R_{kl})/N$ is the large-scale fading coefficient.

Due to the relative movement between the user and the access point, the estimated channel state information becomes progressively outdated over time. Based on a channel aging model, the channel state information for the data transmission can be modeled by an initial channel state information as follows:

$$h_{kl,n} = \rho_{k,n} h_{kl,0} + \bar{\rho}_{k,n} g_{kl,n}, n=1,\ldots,\tau$$

Where $g_{kl,n} \sim CN(0, R_{kl})$ is an independent innovation component at the n-th time slot, 0, $\rho_{k,n}$, 1 is a temporal correlation coefficient between the user k's channels at the 0-th time slot and the n-th time slot, and $$\bar{\rho}_{k,n} = \sqrt{1 - \rho_{k,n}^2}$$

is an error coefficient due to channel aging. Based on Jakes' model, the forgoing can be calculated as:

$$\rho_{k,n} = J_0(2\pi f_{D,k} T_s n), \forall k, \forall n$$

where $J_0(.)$ is a zeroth-order Bessel function of the first kind. $T_s$ is a sampling interval, and $f_{D,k}=(v_k f_c)/c$ is Doppler frequency shift. Where $v_k$ is the user k's movement speed, $f_c$ is a carrier frequency, and c is the speed of light.

Due to the channel aging effect described above, an estimated channel state information and an estimated error of a data transmission part are as follows, respectively:

$$\hat{h}_{kl,n} = \rho_{k,n} h_{kl,0}, n=1,\ldots,\tau$$

$$\tilde{h}_{kl,n} = h_{kl,n} - \hat{h}_{kl,n} = \bar{\rho}_{k,n} g_{kl,n}$$

where the distribution of $\hat{h}_{kl,n}$ is CN $(0, \rho_{k,n}^2 R_{kl})$, the distribution of $\tilde{h}_{kl,n}$ is CN $(0, C_{kl,n})$, and a variance of the estimated error is $C_{kl,n} = (1 - \rho_{k,n}^2) R_{kl}$.

The signal $r_{k,n}$ received by the k-th user in the n-th time slot is as follows:

$$r_{k,n} = \sum_{l=1}^{L} h_{kl,n}^H x_{l,n} + w_{k,n} = \sqrt{p_d} \sum_{l=1}^{L} h_{kl,n}^H \sqrt{t_l}\, v_{c,l,n}^{norm} s_{c,n} + \sqrt{\frac{p_d}{K}} \sum_{l=1}^{L} h_{kl,n}^H \sqrt{1-t_l}\, v_{kl,n}^{norm} s_{k,n} + \sqrt{\frac{p_d}{K}} \sum_{i \ne k}^{K} \sum_{l=1}^{L} h_{kl,n}^H \sqrt{1-t_l}\, v_{il,n}^{norm} s_{i,n} + w_{k,n}$$

The private message stream is considered as noise. The super common message stream in the signal $r_{k,n}$ is decoded using the common codebook. The signal of the super common message stream is removed by the successive interference cancellation technology. Subsequently, the user considers the private message stream of other users as noise and decodes the private message streams directly. The signal interference noise ratios for the common message and the private message at the n-th time slot are calculated as follows, respectively:

$$SINR_{k,n}^c = \frac{p_d \left|\hat{h}_{k,n}^H \bar{v}_{c,n}\right|^2}{\frac{p_d}{K}\sum_{i=1}^{K}\left|\hat{h}_{k,n}^H \bar{v}_{i,n}\right|^2 + p_d \bar{v}_{c,n}^H C_{k,n} \bar{v}_{c,n} + \frac{p_d}{K}\sum_{i=1}^{K}\bar{v}_{i,n}^H C_{k,n} \bar{v}_{i,n} + \sigma^2}$$

$$SINR_{k,n}^p = \frac{\frac{p_d}{K}\left|\hat{h}_{k,n}^H \bar{v}_{k,n}\right|^2}{\frac{p_d}{K}\sum_{i\neq k}^{K}\left|\hat{h}_{k,n}^H \bar{v}_{i,n}\right|^2 + \frac{p_d}{K}\sum_{i=1}^{K}\bar{v}_{i,n}^H C_{k,n} \bar{v}_{i,n} + \sigma^2}$$

where, $$\hat{h}_{k,n} = [\hat{h}_{kl,n}^T, \ldots, \hat{h}_{kL,n}^T]^T$$

$$\bar{v}_{c,n} = [\bar{v}_{c,l,n}^T, \ldots, \bar{v}_{c,L,n}^T]^T, \bar{v}_{c,l,n} = \sqrt{t_1} v_{c,l,n}^{norm}$$

$$\bar{v}_{i,n} = [\bar{v}_{il,n}^T, \ldots, \bar{v}_{iL,n}^T]^T, \bar{v}_{il,n} = \sqrt{1-t_1} v_{il,n}^{norm}$$

$$C_{k,n} = \text{diag}(C_{kl,n}, \ldots, C_{kL,n})$$

Thus, the total rate of the system at the n-th time slot can be calculated as:

$$\text{Sum } R_n = E\{\min_k\{R_{k,n}^c\}\} + \sum_{k=1}^{K} E\{R_{k,n}^p\} =$$

$$E\{\log_2(1 + \min_k\{SINR_{k,n}^c\})\} + \sum_{k=1}^{K} E\{\log_2(1 + SINR_{k,n}^p)\}$$

Embodiment 2

Regarding Embodiment 2, a method of the present invention is configured to realize rate-splitting multi-access under a mobile cell-free massive MIMO system, and includes the following steps specifically:

Scene parameterization: a square area of 250 m×250 m is provided with 20 access points and 4 users, taking as an example a case of a n=10-th time slot of a channel resource block. Here, a following three-slope propagation model is used:

$$\beta_{kl}[dB] = \begin{cases} -81.2, & d_{kl} < 10 \text{ m} \\ -61.2 - 20\log_{10}\left(\frac{d_{kl}}{1 \text{ m}}\right), & 10 \text{ m} \leq d_{kl} < 50 \text{ m} \\ -35.7 - 35\log_{10}\left(\frac{d_{kl}}{1 \text{ m}}\right) + F_{kl}, & d_{kl} \geq 50 \text{ m} \end{cases}$$

Where $d_{kl}$ is a horizontal distance from a l-th access point to a k-th user. Shadow fading $F_{kl} \square N(0, 8^2)$ occurs only when a spacing is greater than 50 m, and the correlation thereof is:

$$E\{F_{kl}F_{ij}\} = \frac{8^2}{2}\left(2^{-\delta_{ki}/100m} + 2^{-v_{lj}/100m}\right)$$

Where $\delta_{ki}$ is a distance from the k-th user to the i-th user, and $v_{lj}$ is a distance from the l-th access point to the J-th access point. It is assumed that a communication carrier frequency is $f_c=2$ GHZ. A communication bandwidth is B=20 MHz. A downlink transmission power is $p_d=23$ dBm. A noise power is $\sigma^2=-96$ dBm. A sampling frequency is 15 kHz, and a sampling interval is $T_s=67$ μs.

In a simulation test, Monte Carlo method is used to randomly generate 200 independent user distributions. Simulation is performed based on the forgoing parameters and the process in Embodiment 1.

Figure 3:
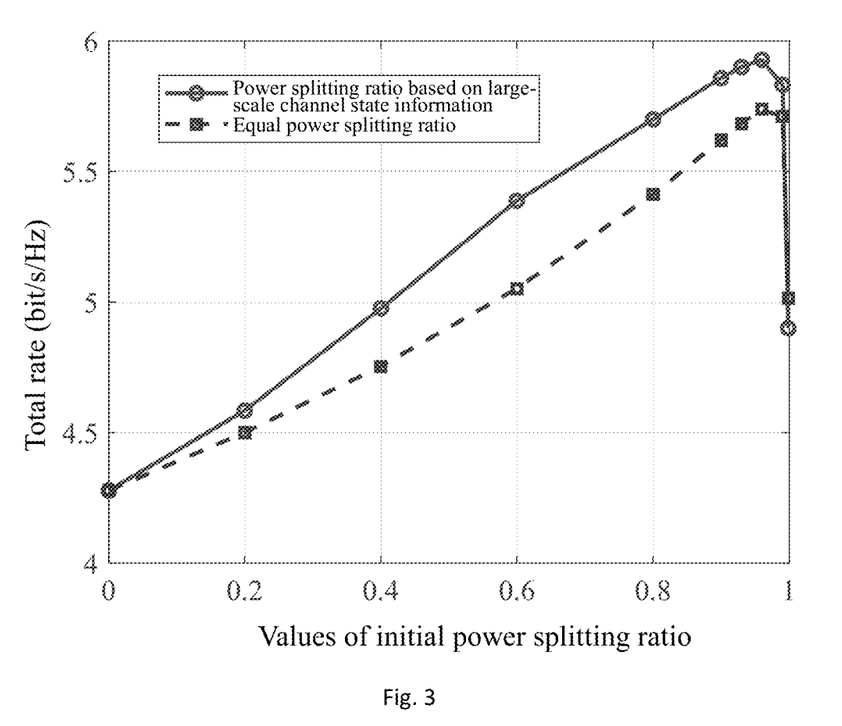
FIG. 3 is an effect picture of a total rate of a power splitting ratio based on large-scale channel state information provided by an embodiment of the present invention.

FIG. 3 is an effect picture of a power splitting ratio based on a large-scale channel state information. Referring to FIG. 3, a vertical coordinate indicates the total rate of the system, and a horizontal coordinate indicates a power splitting ratio distributed to a common message. Compared to an equal power splitting ratio for each of the access points in a rate-splitting multi-access assisted cell-free massive MIMO system, in an example of the present invention, the total rate of the system is significantly improved after the power splitting ratio is adjusted using large-scale channel state information.

Figure 4:
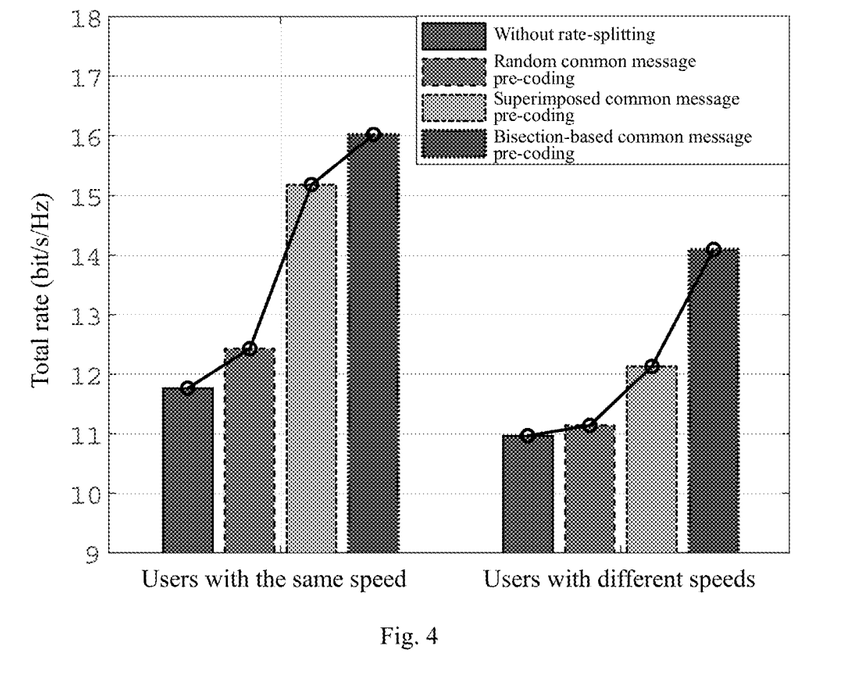
FIG. 4 is an effect picture of a total rate of common message pre-coding based on bisection-based iterative optimization provided by an embodiment of the present invention.

FIG. 4 is an effect picture of pre-coding the common message based on bisection-based iterative optimization. Referring to FIG. 4, a vertical coordinate represents the total rate of the system, and a horizontal coordinate represents two different movement conditions of a user. The users with different speeds make the effects of interference within the system more dramatic and complex compared to the users with the same speed. Under different mobile environment configurations, compared to random common message pre-coding and superimposed common message pre-coding, a pre-coding method using a bisection-based iterative optimization method consistently has the best total rate performance in an example of the present invention. The performance of low-complexity superimposed common message pre-coding is close to common message pre-coding of the bisection-based iterative optimization for the users with the same speed, but the performance is much worse than common message pre-coding of the bisection-based iterative optimization for the users with different speeds. In the present invention, the robustness of the cell-free massive MIMO system in a complex mobile environment is enhanced.

In summary, an embodiment of the present invention proposes a method for realizing rate-splitting multi-access in a mobile cell-free massive MIMO system. Considering outdated channel state information due to mobility, rate-splitting multi-access technology can effectively enhance the interference management capability of the cell-free massive MIMO system, and can significantly improve the transmission rate performance of the system and the robustness of the system in the complex mobile environment.

A power splitting ratio solution based on large-scale channel state information proposed in the present invention has low computational complexity, high efficiency, and better practical value. Private message pre-coding in the present invention can directly use various linear pre-coding solutions in a conventional cell-free massive MIMO system. The common message pre-coding is designed separately for faster solution.

It will be understood by the person skilled in the art that the accompanying drawings are merely the schematic diagram of one embodiment, and that a module or a process in the accompanying drawings are not necessary to carry out the present invention.

As can be seen from the forgoing description of the embodiments, it is clear to the person skilled in the art that the present invention can be realized with the aid of software plus a necessary common hardware platform. Based on this understanding, the technical solution of the present invention, in essence or as a contribution to the prior art, can be embodied in the form of a software product. The software product of a computer may be stored in a storage medium, such as a ROM/RAM, a disk, a CD-ROM, or the like, and includes a number of instructions to cause one computer apparatus (which can be a personal computer, a server, or a network apparatus, or the like) to carry out the method described in the various embodiments, or in some portions of embodiments, of the present invention.

The various embodiments in this specification are described in a progressive manner. The same or similar parts between the various embodiments can be referred to each other. Each embodiment focuses on the difference from other embodiments. In particular, since a device or system embodiment is basically similar to a method embodiment, the description is relatively simple. For related parts, please refer to the part of the description of the method embodiment. The device and system embodiments described above are merely schematic. In addition, a unit described as a separate component can or can not be physically separated. The component displayed as the unit can or can not be a physical unit, that is, the unit or the component can be located in one place, or can be distributed on a plurality of network units. Part or all of the modules can be selected according to actual needs to achieve the objective of the solution of the embodiment. It can be understood and implemented by the person skilled in the art without creative labor.

The forgoing are only preferable specific embodiments of the present invention, but the protection scope of the present invention is not limited thereto. The person skilled in the art can easily think of. changes or substitutions within the technical scope disclosed by the present invention, which should be covered within the protection scope of the present invention. Therefore, the scope of protection of the present invention should be based on the scope of protection of the claims.

What is claimed is:

1. A method for realizing rate-splitting multi-access in a mobile cell-free massive MIMO system, comprising:
    splitting, by an access point in the mobile cell-free massive MIMO system, the data of each user into two parts with a common message and a private message, coding all the common message into one super common message stream, and coding each piece of the private message into a private message stream;
    determining, by the access point, a power splitting ratio between the common message and the private message based on large-scale channel state information;
    coding, by the access point, the private message stream using an arbitrary linear pre-coding method, solving, by the access point, the problem of maximizing the minimum common message rate of users using bisection-based iterative optimization to obtain an optimal pre-coding method for the super common message stream, and coding the super common message stream using the optimal pre-coding method;
    sending, by the access point, the final coded super common message streams to user terminals after superimposing the final coded super common message stream on the private message stream;
    first decoding, by the user terminal, the super common message stream, removing the super common message stream using successive interference cancellation technology, and then decoding the private message stream.

2. The method according to claim 1, wherein the steps of splitting, by the access point in the mobile cell-free massive MIMO system, the data of each of the users into two parts with the common message and the private message, coding all the common message into one super common message stream, and coding each piece of the private message into the private message stream, comprise:
    assuming that the cell-free massive MIMO system comprises L access points and K users, the message sent by each of the access points to the user being $W_k$, $k=1, \ldots, K$, and splitting, by each of the access points, user message $W_k$ into the common message $W_{c,k}$ and the private message $W_{p,k}$;
    combining all the common message $W_{c,1}, \ldots, W_{c,K}$ of all the users into one super common message $W_c$, coding the super common message $W_c$ into the super common message stream $s_c$ using a common codebook, and coding the private message $W_{p,1}, \ldots, W_{p,K}$ of each of the users into the private message streams $s_1, \ldots, s_K$.

3. The method according to claim 2, wherein the step of determining, by the access point, the power splitting ratio between the common message and the private message based on the large-scale channel state information comprises:
    calculating, by each of the access points, the power splitting ratio between the common message and the private message based on the large-scale channel state information using the following equation:

$$t_l = t + \Delta_l$$

$$\Delta_l = \omega \frac{\beta_l - \left(\sum_{l=1}^{L} \beta_l\right)/L}{\max\left\{\left|\beta_l - \left(\sum_{l=1}^{L} \beta_l\right)/L\right|\right\}}$$

$$\beta_l = \left(\left(\sum_{k=1}^{K} \beta_{kl}\right)/K\right)^\alpha$$

$$\omega = \min\{t-0, 1-t\}/\varepsilon$$

where t is an initial power splitting ratio of the common message and the private message of each of the access points, $\Delta_l$ is a power splitting ratio adjustment factor of each of the access points, $\beta_{kl}$ is a large-scale fading coefficient between a k-th user and a l-th access point, $\beta_l$ is an average channel quality coefficient from the l-th access point to all the users, $\alpha$ is a scaling factor of average channel quality, $\omega$ is an adjustment range of a power splitting ratio, $\varepsilon$ is a scaling factor of the adjustment range, and $t_l$ is an adjusted power splitting ratio of the common message and the private message of the access point.

4. The method according to claim 3, wherein the step of coding, by the access point, the private message stream using the arbitrary linear pre-coding method comprises:
    using, by a normalized pre-coding vector $v_{c,kl}^{norm}$ of the private message stream, various linear pre-coding solutions obtained in cell-free massive MIMO, the linear pre-coding solutions comprising maximum ratio transmission pre-coding, local minimum mean-square error pre-coding, and centralized minimum mean-square error pre-coding;
    calculating normalized maximum ratio transmission pre-coding as:

$$v_{kl,n}^{norm} = \hat{h}_{kl,n} / \sqrt{E\left\{\left\|\hat{h}_{kl,n}\right\|^2\right\}}$$

where $\hat{h}_{kl,n}$ is an estimated channel state information from the k-th user to the l-th access point at a n-th time slot;
Calculating normalized local minimum mean-square error pre-coding as:

$$v_{kl,n}^{norm} = v_{kl,n}/\sqrt{E\{\|v_{kl,n}\|^2\}}$$

where $v_{kl,n}$ is minimum mean-square error pre-coding designed for the k-th user by the l-th access point at the n-th time slot based on local channel state information, and calculated as:

$$v_{kl,n} = \frac{p_d(1-t_l)}{K}\left(\sum_{i=1}^{K}\frac{p_d(1-t_l)}{K}\left(\hat{h}_{il,n}\hat{h}_{il,n}^H + C_{il,n}\right) + \sigma^2 I_N\right)^{-1}\hat{h}_{kl,n}$$

where $p_d$ is a maximum downlink transmission power per the access point, $C_{il,n}$ is a variance of a channel estimated error from the i-th user to the l-th access point at the n-th time slot, and $\sigma^2$ is a noise power of a receiver; calculating normalized centralized minimum mean-square error pre-coding as:

$$v_{kl,n}^{norm} = v_{kl,n}/\sqrt{\max_{l=1,\ldots,L}\{E\{\|v_{kl,n}\|^2\}\}}$$

where $v_{kl,n}$ is minimum mean-square error pre-coding designed for the k-th user by the l-th access point at the n-th time slot based on global channel state information, and calculated as:

$$v_{kl,n} = \frac{1}{\sqrt{1-t_l}}\bar{v}_{kl,n}$$

$$[v_{k1,n}^T, \ldots, v_{kL,n}^T]^T = \bar{v}_{k,n} = \frac{p_d}{K}\left(\sum_{i=1}^{K}\frac{p_d}{K}\left(\hat{h}_{i,n}\hat{h}_{i,n}^H + C_{i,n}\right) + \sigma^2 I_{LN}\right)^{-1}\hat{h}_{k,n}$$

$\hat{h}_{i,n}$ is an estimated channel state information vector consisting of the i-th user to all the where access points at the n-th time slot, $C_{i,n}$ is a variance of an channel estimated error vector, and $\bar{v}_{k,n}$ is a minimum mean-square error pre-coding vector designed for the k-th user by a central processing unit at the n-th time slot based on the global channel state information.

5. The method according to claim 3, wherein the steps of solving, by the access point, the problem of maximizing the minimum common message rate of users using bisection-based iterative optimization to obtain an optimal pre-coding method for the super common message stream, and coding the super common message stream using the optimal pre-coding method, comprise:
constructing the following problem of maximizing the minimum common message rate based on power constraint of each of the access points:

$$\max_{\{v_{c,l,n}^{norm}\}}\min_{k=1,\ldots,K} R_{k,n}^c(v_{c,l,n}^{norm})$$

$$\text{s.t. } \|v_{c,l,n}^{norm}\|^2 \leq 1, \forall l$$

where $R_{k,n}^c$ is a rate at which the k-th user decodes the received common message at the n-th time slot, and is a function of normalized common message pre-coding $v_{c,l,n}^{norm}$;

the forgoing equation is equivalent to:

$$\max_{\{\bar{v}_{c,n}\}}\min_{k=1,\ldots,K} \frac{p_d|\hat{h}_{k,n}^H\bar{v}_{c,n}|^2}{p_d(\bar{v}_{c,n})^H C_{k,n}\bar{v}_{c,n} + \kappa_{k,n}}$$

$$\text{s.t. } \|v_{c,l,n}^{norm}\int\|^2, , 1, \forall l$$

where $\bar{v}_{c,n}$ is a common message pre-coding vector consisting of all the access points at the n-th time slot; $\kappa_{k,n}$ is a function of a private message pre-coding vector, is independent of an optimization variable $\bar{v}_{c,n}$ and is calculated as:

$$\kappa_{k,n} = \frac{p_d}{K}\sum_{i=1}^{K}|\hat{h}_{k,n}^H\bar{v}_{i,n}|^2 + \frac{p_d}{K}\sum_{i=1}^{K}\bar{v}_{i,n}^H C_{k,n}\bar{v}_{i,n} + \sigma^2$$

$\bar{v}_{i,n}$ is the private message pre-coding vector designed for all the access points by the i-th user at the n-th time slot; solving the forgoing problem of maximizing the minimum common message rate using the bisection-based iterative optimization to obtain an optimal common message pre-coding solution, and coding the super common message stream using the optimal common message pre-coding solution.

6. The method according to claim 5, wherein the step of sending, by the access point, the final coded super common message streams to the user terminals after superimposing the final coded super common message stream on the private message stream comprises:
superimposing the linear pre-final coded super common message stream and private message streams together and combining a transmission signal $x_l$ of the l-th access point as:

$$x_l = \sqrt{p_d t_l}\, v_{c,l}^{norm} s_c + \sqrt{\frac{p_d(1-t_l)}{K}}\sum_{i=1}^{K} v_{il}^{norm} s_i$$

where $p_d$ is a maximum downlink transmission power of each of the access points, $t_l$ is a transmission power splitting ratio of the super common message stream of the l-th access point, message $s_i$ is the private message sent to the i-th user, and $s_c$ is the sent common message.

7. The method according to claim 6, wherein the steps of first decoding, by the user terminal, the super common message stream, removing the super common message stream using the successive interference cancellation technology, and then decoding the private message stream comprise:
a signal $r_{k,n}$ received by the k-th user in the n-th time slot being:

$$r_{k,n} = \sum_{l=1}^{L} h_{kl,n}^H x_{l,n} + w_{k,n} = \sqrt{p_d}\sum_{l=1}^{L} h_{kl,n}^H \sqrt{t_l}\, v_{c,l,n}^{norm} s_{c,n} +$$

$$\sqrt{\frac{p_d}{K}}\sum_{l=1}^{L} h_{kl,n}^H \sqrt{1-t_l}\, v_{kl,n}^{norm} s_{k,n} + \sqrt{\frac{p_d}{K}}\sum_{i\neq k}^{K}\sum_{l=1}^{L} h_{kl,n}^H \sqrt{1-t_l}\, v_{il,n}^{norm} s_{i,n} + w_{k,n}$$

decoding the super common message stream in the signal $r_{k,n}$ using the common codebook, removing the signal of the super common message stream by successive interference cancellation technology, considering, by the user, the private message streams of the other users as noise, decoding the private message stream, and calculating signal interference noise ratios of the common message and the private message in the n-th time slot as respectively:

$$\text{SINR}_{k,n}^c = \frac{p_d \left|\hat{h}_{k,n}^H \bar{v}_{c,n}\right|^2}{\frac{p_d}{K}\sum_{i=1}^{K}\left|\hat{h}_{k,n}^H \bar{v}_{i,n}\right|^2 + p_d \bar{v}_{c,n}^H C_{k,n} \bar{v}_{c,n} + \frac{p_d}{K}\sum_{i=1}^{K} \bar{v}_{i,n}^H C_{k,n} \bar{v}_{i,n} + \sigma^2}$$

$$\text{SINR}_{k,n}^p = \frac{\frac{p_d}{K}\left|\hat{h}_{k,n}^H \bar{v}_{k,n}\right|^2}{\frac{p_d}{K}\sum_{i \neq k}^{K}\left|\hat{h}_{k,n}^H \bar{v}_{i,n}\right|^2 + \frac{p_d}{K}\sum_{i=1}^{K} \bar{v}_{i,n}^H C_{k,n} \bar{v}_{i,n} + \sigma^2}$$

where, $$\hat{h}_{k,n} = [\hat{h}_{k1,n}^T, \ldots, \hat{h}_{kL,n}^T]^T$$

$$\bar{v}_{c,n} = [\bar{v}_{c,1,n}^T, \ldots, \bar{v}_{c,L,n}^T]^T, \bar{v}_{c,l,n} = \sqrt{t_l}\, v_{c,l,n}^{norm}$$

$$\bar{v}_{i,n} = [\bar{v}_{i1,n}^T, \ldots, \bar{v}_{iL,n}^T]^T, \bar{v}_{il,n} = \sqrt{1-t_l}\, v_{il,n}^{norm}$$

$$C_{k,n} = \text{diag}(C_{k1,n}, \ldots, C_{kL,n})$$

calculating a total rate of the system at the n-th time slot as:

$$\text{Sum } R_n = E\{\min_k\{R_{k,n}^c\}\} + \sum_{k=1}^{K} E\{R_{k,n}^p\}$$
$$= E\{\log_2(1 + \min_k\{\text{SINR}_{k,n}^c\})\} + \sum_{k=1}^{K} E\{\log_2(1 + \text{SINR}_{k,n}^p)\}$$

\* \* \* \* \*